US006896007B2

(12) United States Patent
Cymbalisty (10) Patent No.: US 6,896,007 B2
(45) Date of Patent: May 24, 2005

(54) HYDRO-DYNAMIC STATIC MIXING APPARATUS AND METHOD FOR USE THEREOF IN TRANSPORTING, CONDITIONING AND SEPARATING OIL SANDS AND THE LIKE

(75) Inventor: Lubomyr M. Cymbalisty, Edmonton (CA)

(73) Assignee: LMC Resources, Inc., Edmonton (CA)

( * ) Notice: Subject to any disclaimer, the term of this patent is extended or adjusted under 35 U.S.C. 154(b) by 0 days.

(21) Appl. No.: 10/361,267

(22) Filed: Feb. 10, 2003

(65) Prior Publication Data

US 2004/0000350 A1 Jan. 1, 2004

Related U.S. Application Data

(60) Provisional application No. 60/392,281, filed on Jun. 28, 2002.

(51) Int. Cl.[7] .............................. F16L 9/00; B01F 5/06
(52) U.S. Cl. ........................ 138/177; 138/178; 138/121; 138/122; 138/DIG. 11; 366/336
(58) Field of Search ................................ 138/177, 121, 138/122, DIG. 8, DIG. 11, 178; 366/336

(56) References Cited

U.S. PATENT DOCUMENTS

| D16,763 S | * | 6/1886 | Pfeifer ...................... D23/266 |
| 1,913,417 A | * | 6/1933 | Ulrich ......................... 138/177 |
| 2,663,321 A | * | 12/1953 | Emil ............................ 138/38 |
| 2,704,556 A | * | 3/1955 | Blish .......................... 138/138 |
| 3,313,577 A |   | 4/1967 | Wolfe .......................... 406/46 |
| 3,331,400 A | * | 7/1967 | Vikaitis ....................... 138/135 |
| 3,721,270 A | * | 3/1973 | Wittgenstein ............... 138/104 |
| 4,144,632 A | * | 3/1979 | Stroupe ..................... 29/469.5 |
| 4,317,353 A | * | 3/1982 | Geppelt et al. ............... 72/299 |
| 4,327,775 A | * | 5/1982 | Tally .......................... 138/103 |
| 4,328,710 A |   | 5/1982 | Cymbalisty et al. ..... 73/863.86 |
| 4,365,974 A |   | 12/1982 | Elmore et al. ................ 48/111 |
| 4,390,281 A |   | 6/1983 | Scriminger ..................... 366/3 |
| 4,410,281 A | * | 10/1983 | Crookes ...................... 366/341 |
| 4,456,034 A | * | 6/1984 | Bixby ......................... 138/122 |
| 4,463,779 A | * | 8/1984 | Wink et al. ................. 138/125 |
| 4,597,852 A |   | 7/1986 | York et al. .................. 208/427 |
| 4,721,560 A |   | 1/1988 | York et al. .................. 208/411 |
| 4,786,368 A |   | 11/1988 | York et al. .................... 202/99 |
| 5,039,227 A |   | 8/1991 | Leung et al. ............... 366/137 |
| 5,080,534 A |   | 1/1992 | Goodson et al. ............. 406/46 |
| 5,264,118 A |   | 11/1993 | Cymerman et al. ......... 208/390 |

(Continued)

FOREIGN PATENT DOCUMENTS

| CA | 2411220 A1 | 12/2003 |
| DE | 715253 C1 | 12/1941 |
| DE | 2048662 A1 | 5/1972 |
| DE | 10042768 A1 | 3/2002 |
| EP | 0608902 A1 | 8/1994 |
| GB | 729618 * | 5/1955 |

OTHER PUBLICATIONS

Map entitled "What of the future" Tar sand areas of the world are now in focus, p. 62a, *Construction Alberta News*, dated May 23, 1977.
Map entitled "Oil Sands Region", dated Dec. 8, 2000.
Article entitled Are Motionless Mixers on the move?, *Process Engineering*, 10–22 thru 10–24.
Article entitled "The Potential of Helically Ribbed Pipes for Solids Transport" by W. Schriek; Reprinted from the Canadian Mining and Metallurgical Bulletin. Oct., 1974.

*Primary Examiner*—Patrick Brinson
(74) *Attorney, Agent, or Firm*—Leydig, Voit & Mayer, Ltd.

(57) ABSTRACT

A static hydro-dynamic mixer undulating interior conduit provides a static mixing apparatus which utilizes a spiral, coiled or curved conduit to cause dynamic mixing of its flowing contents while they are pumped through it. The application includes a method of use in separating oil sands. The mixing is caused by the resistance to flow through the undulated conduit and the resistance increases with pitch and conduit diameter.

5 Claims, 5 Drawing Sheets

U.S. PATENT DOCUMENTS

| | | | |
|---|---|---|---|
| 5,269,650 A | * 12/1993 | Benson | 415/182.1 |
| 5,839,828 A | 11/1998 | Glanville | 366/340 |
| 5,965,784 A | 10/1999 | Bracou et al. | 585/834 |
| 5,967,658 A | 10/1999 | Mohajer | 366/337 |
| 6,119,870 A | 9/2000 | Maciejewski et al. | 209/725 |
| 6,214,213 B1 | 4/2001 | Tipman et al. | 208/390 |
| 6,264,900 B1 | 7/2001 | Schubert et al. | 138/38 X |
| 6,331,072 B1 | * 12/2001 | Schierholz et al. | 366/338 |

* cited by examiner

EXAMPLE OF AN UNDULATING PIPE

Pitch = 4 pipe Dia.

FIG. 1

$D_S = 2 \times r_1 + 2 \times r_2$

FIG. 2

Pitch = 5 pipe Dia.

$r_1$ = pipe radius
$r_2$ = radius of circle formed by pipe center projection points
$C_1$ = centerline of spool (coil)
$D_S$ = Diameter of spool (coil)

EXAMPLE OF THE SCREW TYPE UNDULATING PIPE MIXER

HYDRO-DYNAMIC STATIC MIXING APPARATUS AND METHOD FOR USE THEREOF IN TRANSPORTING, CONDITIONING AND SEPARATING OIL SANDS AND THE LIKE

CROSS-REFERENCE TO RELATED PATENT APPLICATIONS

This patent application claims the benefit of U.S. Provisional Patent Application No. 60/392,281, filed Jun. 28, 2002.

FIELD OF THE INVENTION

This invention pertains to a hydro-dynamic mixer conduit apparatus with no moving parts, generally known in the industry as a static mixer. This invention expands the functionality of static mixers by providing for the mixing and transporting of abrasive materials, e.g., sand, gravel, etc., at high concentrations (above 70 wt. %), at reduced velocities, without creating the risk of plugging the conduit, while minimizing the destructive effect of the abrasive materials on the carrier itself.

More particularly, an application of the conduit mixer apparatus is a method of extraction of oil sands, where the mixer invention, when incorporated into and adapted to existing and modified systems, will give an increase in the quantity of oil recovered and result in an improved quality of the final product, and at a lesser capital cost of equipment and maintenance than is now incurred in the extraction process. Furthermore, it has potential for reducing transportation costs in sand tailings disposal and mine back fill.

This mixer apparatus and method can be adapted to give an effective and improved system of extraction of oil from oil sands deposits of different varieties as they appear in many countries all over the world.

BACKGROUND OF THE INVENTION

The primary immediate utilization of this mixer invention will be in the extraction of oil from the oil sands such as found in northern Alberta, Canada, and more specifically, in the Fort McMurray area in northeastern Alberta.

There, the mined oil sands are comprised of coarse sand particles coated by a thin film of connate water, with oil filling the interstices (voids/spaces) and minute particles of clay and mineral (fines) distributed within the water sheaths.

Water, chemicals and energy in the form of mixing are added to the oil sand, resulting in formation of slurry.

In the rudimentary stage, the slurry contains considerable amounts of unbroken lumps of oil sand, too large for the next stage of processing. This situation becomes more difficult in winter months, when frozen lumps aggravate the problem. To manage the situation, the mixing equipment has to be robust enough to be able to disintegrate oversize ore, and form a homogeneous slurry.

From here, the oil sand slurry moves through conditioning and dilution-settling stages until the oil is eventually separated from the solids, thus forming a final product froth.

Transporting and processing of the slurry carrying material excessively abrasive inflicting extreme wear on equipment and at considerable expense in keeping it moving continuously in order to prevent blockage by floating oil or settling of solids.

Cross reference is made to Cymerman et al. U.S. Pat. No. 5,264,118 entitled "Pipeline Conditioning Process for Mined Oil-Sand" and the references therein for more detailed background information on the types of equipment and methods sought to be applied in the field.

The present invention provides a hydro-dynamic mixer that has several advantages over presently known mixing devices and processes, such as follows:

1. It is an effective mixer of materials by virtue of the dynamic (twirling, fold over, vortexing, gyrating) intermixing action of contents in motion. It is especially effective in mixing solids matters in various liquids, such as a slurry composed of water, oil and sand;

2. It sustains uniformity of mixing without the risk of a high shear rate, which functions are especially important for mixing of oily substances;

3. The process maintains uniform distribution of elements in motion;

4. The process keeps all elements of the contents in continuous suspension during transport. This is important in dealing with contents consisting of differing densities and properties, in order to prevent stratification;

5. The hydro-dynamic mixer handles abrasive solids with relatively low erosion of the conduit, by virtue of the dissipation of the abrasive action over the total cross-section of the conduit, as opposed to the action of solids traveling on the bottom of a straight pipe;

6. It is a transportation facility for carrying and delivery of the contents in addition to being a mixer; and 7. It can be incorporated into existing transportation system in intervals as a consistency revitalizer of deposited high density materials such as sand and/or floated off aerated substance, to regain uniformity of dispersion.

These and other advantages of the invention, as well as additional inventive features, will be apparent from the description of the invention provided herein.

BRIEF SUMMARY OF THE INVENTION

The invention is an undulating conduit hydro-dynamic mixer which is a static hydro-dynamic mixing apparatus utilizing a spiral, coiled, curved or serpentine conduit that causes dynamic mixing of its flowing contents by virtue of the undulation of the conduit creating turbulent flow patterns while the contents are being pumped through it. The mixing occurs because of the undulations in the static pipeline apparatus creating dynamic turbulent flow patterns of the contents.

In one of its important applications, the undulating conduit hydro-dynamic mixer can be interposed at various stages of processing and transportation of oil-laden middlings in oil sands separation systems.

DETAILED DESCRIPTION OF THE INVENTION

The following descriptions are of the static undulating conduit hydro-dynamic mixer (the "apparatus") and the processes involved in the application of the invention.

The Undulating Conduit Hydro-Dynamic Mixer

The undulating conduit hydro-dynamic mixer is the physical plant that provides controlled continuous positive dynamic interaction within the transported slurry. The undulating conduit creates the optimum environment for mixing of the oil sands slurry. The action may be described as directional flow changes, twirling, spiraling, gyrating, folding the slurry over on itself and stretching the mixture as it is transported.

The above pattern of dynamic flow provides several advantages usually not available in present mixing systems.

Figure 1:
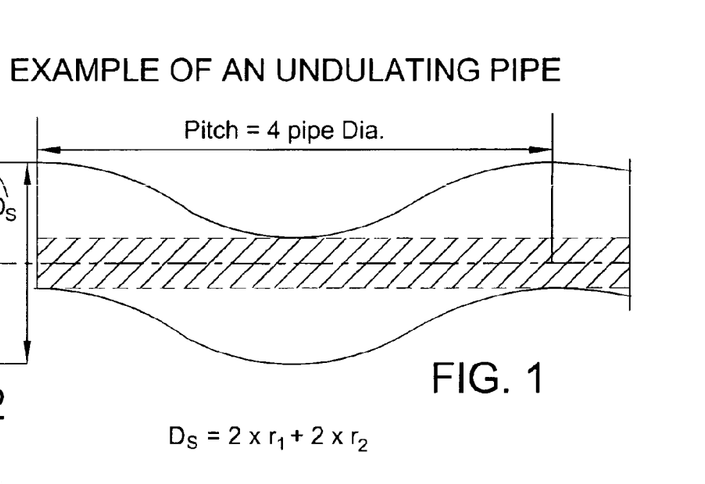
FIG. 1 is an illustrative side sectional view of a length of undulating conduit in accordance with the present invention.
Figure 2:
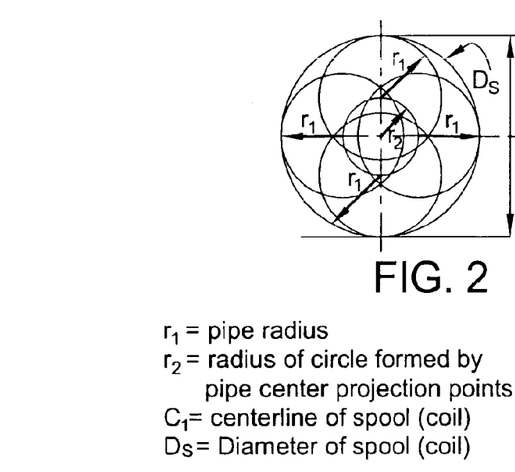
FIG. 2 is an end diagrammatic view of the conduit of FIG. 1.

Referring to FIGS. 1 and 2, conjointly, the undulating conduit hydro-dynamic mixer is a static mixing apparatus of a preselected and predetermined length of elongated tubular conduit. It allows for mixing and transporting various substances including highly-abrasive solids contained slurries. As further discussed herein, the conduit member can be interconnected into a transportation and processing separation system.

Figure 3:
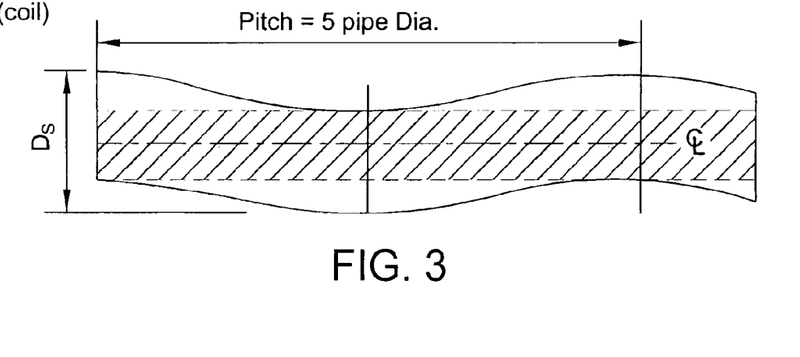
FIG. 3 is an illustrative side sectional view of an alternative length of undulating conduit having a different pitch.
Figure 4:
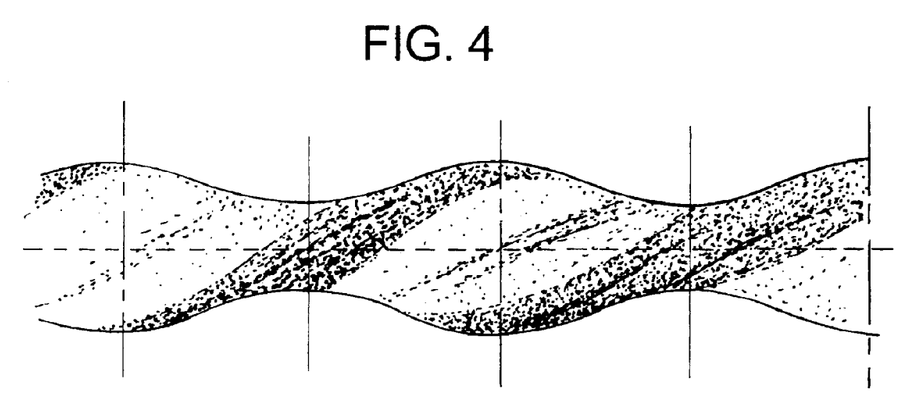
FIG. 4 is an illustrative side view of a spiral length alternative form of undulating conduit mixer.
Figure 4A:
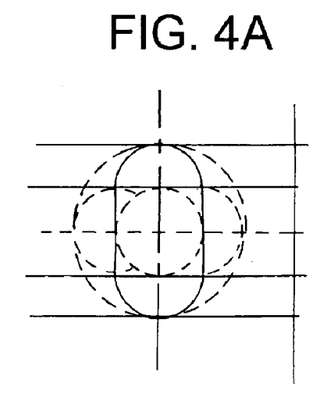
FIG. 4a is an end view of the conduit in FIG. 4.
Figure 5:
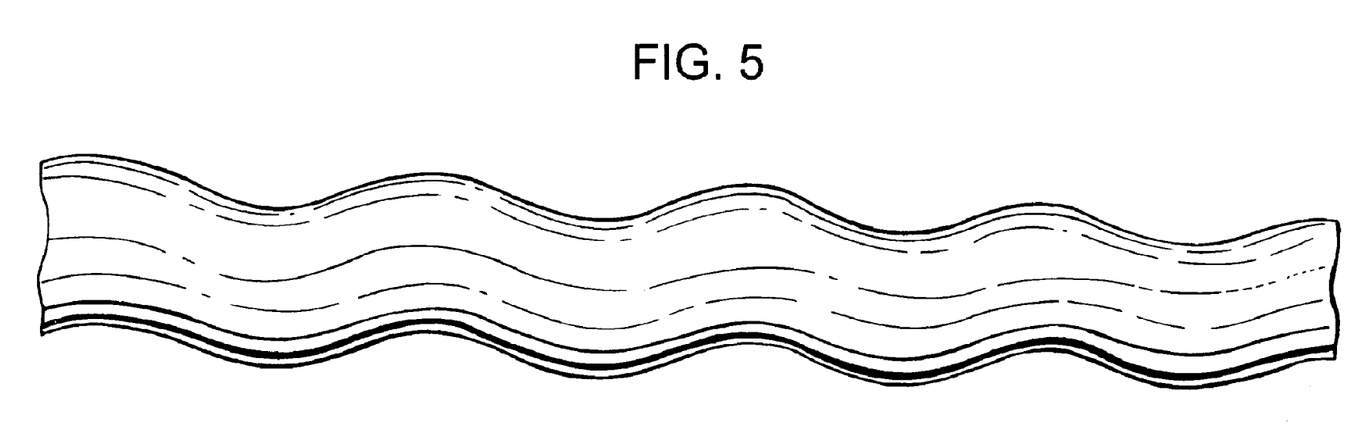
FIG. 5 is a perspective sectional view of a length of undulating conduit.

In accordance with the present invention, the undulations may take a variety of serpentine paths or shapes with different pitches (FIG. 3), repetitive or varying waves and differing cross sections, FIGS. 4, 4a, 5, 7. The undulations can be of a spiral type formation (i.e., spring wound configuration) such as used for round pipe cross-sections or a screw type shape for pipes of oval, rectangular, or other geometric cross-sections or combinations thereof.

Spiral type undulations are defined by geometry, having parameters such as conduit inner radius, and radius and pitch of coil. It will be appreciated that the use of other than round conduit is permissible as well. Screw shaped undulations can be defined by a cross-section of the conduit, for instance, oval, rectangular, elliptical or other geometric shape.

Alternatively, undulations may be formed by indenting the outside of round pipe in a screw type manner or in the case of using slurry including solids, over the top portion only. The indentations can be placed at predetermined intervals.

Yet another option to prevent stratification is to maintain turbulence in a large diameter pipe which can be done by installing deflectors internally in a screw type fashion. The deflectors are preferably only provided in the upper portion of the conduit inside where there is a smaller amount of suspended coarse abrasive solids than in the lower portion of the conduit.

Premature Separation/Stratification

The transportation of slurries of various compositions particularly in large diameter straight pipes (10"+) tends to give rise to premature separation and/or stratification of elements.

The undulating conduit hydro-dynamic mixer lends itself to precise control and therefore management of the flow, while the alternating flow patterns creates a mixing effect which prevents premature separation and stratification of elements transported within the pipeline.

Flow Velocity

The turbulent action in the undulating conduit hydro-dynamic mixer keeps solids in constant suspense, which means that deposition of solids along the base of the pipe would be lower than in a straight pipe; ergo, considerably lower velocities of slurry travel are feasible. The lower velocity would reduce the abrasive effect of the solids.

Slurry Conditioning

The entry of screened slurry into the undulating conduit hydro-dynamic mixer, brings with it lumps of oil sand reduced in size for additional digestion.

The turbulent flow pattern in the undulating conduit hydro-dynamic mixer is conducive to better abrading and digestion of lumps.

The "folding-over" mixing action of the undulating conduit hydro-dynamic mixer enhances the context and attachment of air to the oil droplets thus enhancing the conditioning of the slurry.

Economy of Development of the Invention Prototype

Since the undulating conduit hydro-dynamic mixer system is based on principles of hydraulic flow, most of its parameters can be established theoretically and a numerical model developed and proven experimentally within a relatively short time and at a reasonable cost.

The Undulating Conduit Hydro-Dynamic Mixer Can Be Utilized in Several Phases of Mixing and Separation The undulating conduit hydro-dynamic mixer lends itself to use in at least three stages of mixing and separation.

Stage #1—Undulating conduit hydro-dynamic mixer inserted as hydro-dynamic mixer ("B") between contactor ("A") and sand settler ("D"). The oil sand slurry is preconditioned in the contactor ("A") as dense media. After one minute of mixing the slurry is diluted and pumped through the undulating pipe hydro mixer ("B") where it is further conditioned before entering the sand settler ("D") and cyclo distributor ("C") prepared as dense media and after dilution its elements have to stay in suspense to prevent conglomerates forming from the solids, bitumen and fines. The turbulent flow of the undulating conduit hydro-dynamic mixer keeps these in suspension until the slurry reaches the flotation stage.

In Stage #2, the introduction of the undulating conduit hydro-dynamic mixer in transportation of the oil laden middlings from the sand settler to the froth separator ("F") will prevent premature coalescence of aerated oil globules, and solids. The undulating conduit hydro-dynamic mixer keeps the contents in suspension so that they can be evenly distributed across the Froth Separator area to yield optimum product.

In stage #3, the undulating conduit hydro-dynamic mixer will transfer middlings from the froth separator to the contactor, to be used as a slurry dilution stream. The working of this system enhances oil recovery by bringing the unaerated oil droplets back into the system, and also recycles fines which enhance transport of the slurry.

Mobility of the Undulating Conduit Hydro-Dynamic Mixer

The undulating conduit hydro-dynamic mixer can be structured to be compact and movable, so that it can be transported about in the mining sites as require.

Cost Effectiveness

The undulating conduit hydro-dynamic mixer can displace some of the mixing equipment which is in current use at a considerably lower capital cost, lower operational and maintenance cost; and reduced down time to repair and/or replace worn out equipment.

The Process Described in the Application of this Invention

Oil sands contain sharp, various sized grains of sand particles, bitumen (a high viscosity oil) and connate water containing various amounts of corrosive chlorides. Conditioning starts in contactor ("A") with the addition of fresh water, middlings from froth separator and chemicals if required.

The next step in preparation of slurry is accomplished in the hydro-dynamic mixer, where it will be gently conditioned by thoroughly mixing while air, chemicals, predetermined energy and set time will be applied.

The next function is accomplished in the sand settler ("D"). Here, the slurry is diluted, mixed with recycled middlings in the cyclo-distributor ("C") followed by settling of the sand and floating of oil and middlings.

Settled sand, diluted by tailings from secondary oil recovery is removed for disposal while oil and floating middlings are transported by undulating conduit hydro-dynamic mixer, to prevent coalescence of aerated oil droplets with high solids middlings, to the Froth Separator ("F"). In this stage of process, oil is floated off and removed as final froth while middlings containing liquid, some oil and fines (solid particles usually less than 44 microns), are recycled to the Contactor.

Status Undulating Conduit Hydro-Dynamic Mixer Management of Settling and Flotation Problems The transport of slurry in straight pipes is subject to the problem of blockage caused by solids. At times of reduced velocities and/or stoppage, heterogeneous slurries, such as oil sand slurry, settle rapidly to form a sandy or hard deposit.

Similarly, in particular, when processing high oil content ore (+12%), the spontaneous rise of aerated oil droplets form viscous gumbo at top of conduit, which increases in size with time of travel, building up system pressure, thus restricting the flow of slurry.

The undulating conduit hydro-dynamic mixer will attempt to overcome the above deteriorating conditions, even at lower flow velocity by keeping the slurry in a state of turbulent flow. The slurry is subjected to continuous flow direction changes, vortexing, and twirling and as a result keeping the elements in motion.

Undulating Conduit Hydro-Dynamic Mixer Management of Abrasion Problem

By keeping solids in suspension the abrasive aspect of moving sand will be reduced. The velocity can be reduced without loss of mixing benefit; the sands are evenly distributed within the slurry which also minimizes the abrasive effect on the walls of the conduit. With the sands in continuous suspension there is no settlement to the bottom of the conduit to create uneven wear on its base. In other words, the total wear factor is both reduced and spread out evenly within the pipe.

Applications

This invention offers a great range of potential applications. It is a mixer and can also serve as a materials transporter which incorporates a controlled mixing function.

Some uses are oil extraction from Alberta oil sands (water wet sand grains); USA oil sands (oil coated sand grains); and oil sands deposits in other parts of the world.

Various utilities such as water treatment plants and sewage treatment plants.

Industries uses such as petrochemical industries, various solids transport industries such as transport of potash ore, dredging of harbors and rivers, paint manufacturing, and the food preparation industry. It can enhance and improve existing systems by the principle of the undulating conduit apparatus.

The particular use to which this invention is suited is in the extraction of oil from the Fort McMurray oil sands deposits in the vicinity of the Athabasca River in northeastern Alberta, Canada. Because of the smaller size of the apparatus, its low capital cost, lower operating expenses and portability, this invention has potential to allow the development of marginal oil sands deposits by small scale operators.

This capability may be of benefit to less prosperous countries and smaller economies which have oil sands deposits.

Figure 6:
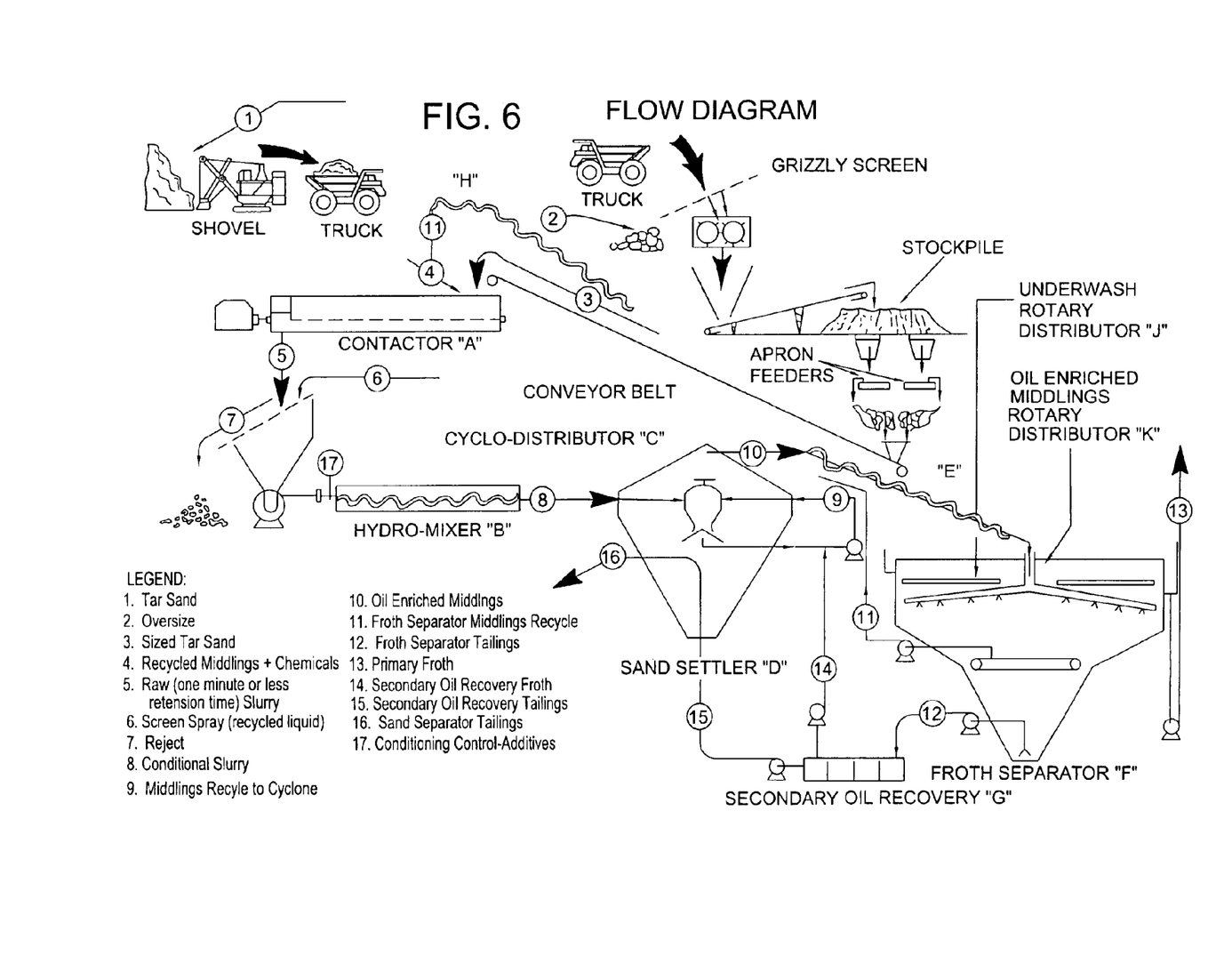
FIG. 6 is a flow diagram of an oil sands separating method utilizing the undulating conduit of the present invention.
Figure 7:
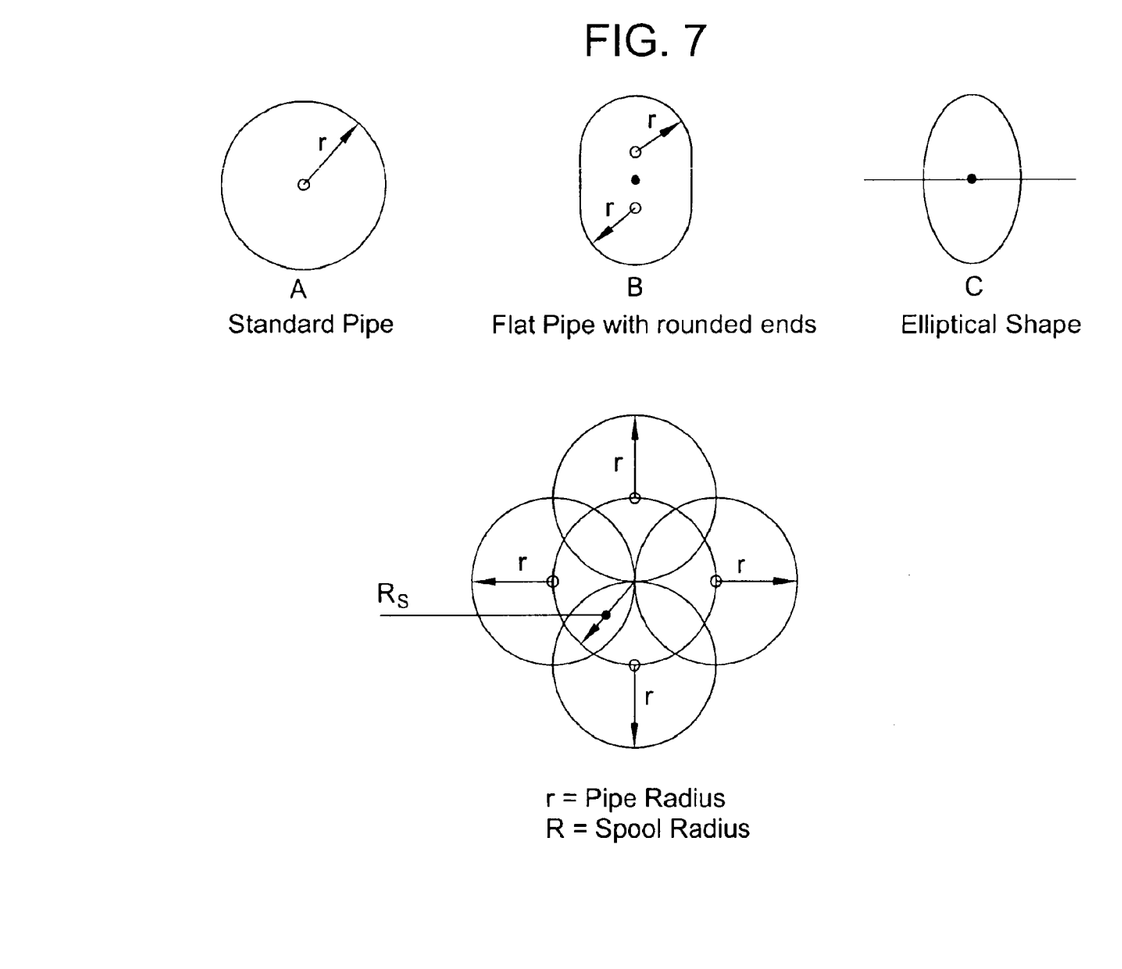
FIG. 7 is an illustrative representation of various different shaped conduit end views.

Explanation of Flow Diagram (FIG. 6) Showing Utilization of Static Undulating Conduit Hydro-Dynamic Mixer in the Proposed Oil Extraction Process FIG. 6, is an illustrative flow sheet for a method of separating oil from oil sands.

Contactor ("A")

The contactor is a sturdy mixing device, for preconditioning of the oil sand slurry. The Contactor accomplishes oil sand lump digestion efficiently with a minimum of emulsification of the bitumen.

The contactor can be mounted and operated on mobile trailers, thus increasing mining flexibility. Retention time at this stage should be preferably short (less than one minute) while holding slurry liquid consistency around 25% by weight.

The temperature of slurry at this stage, should be maintained around 30–55° C., to enhance diminution of tar sand lumps, thus liberating bitumen matrix intact.

To control the density of the above slurry, a stream (4), containing fresh water, chemicals and recycled middling from the froth separator ("F") is added.

After mixing is completed, this slurry (5), overflows the lip of the contactor and then falls through the screen into the pump hopper.

Fresh hot water (6) or a recycle stream (11), can be applied to dilute and propel this slurry through the screen openings, as well as to wash off attached oil of the rejected oversize lumps (7).

The size of rejects (7) is dictated by the handling capability of the follow up equipment, in this case, the diameter of Undulating Conduit Hydro-Dynamic Mixer. During cold winter months, rejects containing frozen lumps of undigested oil sand might be recycled back to the Contactor ("A").

Process Additives

The final adjustment of slurry density, the slurry pH, as well as addition of dissolved air, can be made via stream (17), before it enters the Undulating Conduit Hydro-Dynamic Mixer. Using the undulating conduit (in contrast to straight pipe) addition of dissolved air could be tolerated, without increase of possible flow stratification effect.

The screened preconditioned slurry with additives (17), is pumped through the Undulating Conduit Hydro-Dynamic Mixer. For effective mixing, one to two minutes of retention time would be adequate.

Static Hydro-Dynamic Mixer Undulating Conduit

The static hydro-dynamic mixer undulating conduit can be used in three different configurations to fulfill three different functions. In FIG. 6 (shown as "B", "E", and "H"), three static hydro-dynamic mixer undulating conduits are utilized. It can be utilized firstly as a pure mixer. Secondly, it can be utilized as a transporter mixer. Thirdly, it can serve as inserts in a transportation pipe system to revitalize contents in transit.

Static hydro-dynamic mixer undulating conduit can be used as a mixer only, by applying small length of pipe, having undulation of a short pitch configuration. This static hydro-dynamic mixer undulating conduit unit could be mounted on mobile equipment and operated close to mining area.

On the other hand, the static hydro-dynamic mixer undulating conduit could also consist of a combination of mixing and transport system (combination of straight pipe with insertions of undulating pipes, or long pitch undulations). The correct design of this unit, establishing length, diameter of pipe, diameter of spool and pitch, could greatly influence the product quality.

Sand Settler ("D")

Since sand represents around 80% of oil sand weight, as much of it as possible needs to be removed from the slurry as early as possible to avoid abrasive wear on downstream equipment.

Conditioned slurry (8) is introduced into the sand settler ("D") by means of the cyclo-distributor ("C"). Here it is dispersed and diluted by recycled middling stream (9), which also induces an additional rotational momentum. The resulting motion enhances turbulence within the middling in the lower section of the vessel, thus reducing formation of gelling (pseudo plastic behavior).

The cyclonic action within the cyclo-distributor enhances the separation of sand and aerated oil droplets by means of turbulence and density differential.

After exiting the cyclo-distributor, rising aerated oil droplets and some middlings are floated to the top of the vessel and then leave the sand separator by means of a stream (10) which is a Undulating Conduit Hydro-Dynamic Mixer ("E") functioning as a transporter/mixer.

The sand portion of the slurry is discharged onto the conical deflector, spreading it, thus permitting release of the oil trapped by outflowing stream. This allows the oil to rise to the top, while the sand is distributed uniformly across the lower portion of the sand settler.

As the sand settles towards the bottom of the settler, it densifies, releasing middling and bitumen resulting in the creation of an interface.

Further influx of middling and bitumen, creates an upward flow current, conveying it towards the cone under the cyclone distributor, and joins stream (9).

The density of tailings stream (16), drawn from bottom of the vessel is controlled by injection of secondary oil recovery tailings (15).

Froth Separator ("F")

Oil enriched middling stream (10), is transported from the sand settler to the froth separator by means of the Undulating Conduit Hydro-Dynamic Mixer which prevents coagulation of aerated oil droplets. The stream entering the froth separator via the rotary distributor ("K"), is laid down uniformly across the vessel.

Streams exiting the rotating distributor ("K") are mixed with surrounding liquid, and thus diluted, are the beginning of the actual process of separation.

The released aerated oil globules begin to rise to the top of the vessel, where they form a product named froth (11), while sand particles, some of unaerated bitumen and fines settle to the bottom of the froth separator.

Underwash

Fresh (pretreated) underwash water is introduced preferably by way of underwash rotary distributor ("J") beneath the froth layer, but above the oil enriched middling distributor ("K"). In this way, a highly diluted zone is provided, through which the ascending bitumen passes immediately before joining the froth. This step contributes to formation of higher froth quality by washing rising aerated bitumen droplets and maintaining a mild downward current that depresses the fines to the middling withdrawal pipe (11). The underwash water rate is usually higher than the ratio of water to oil in the froth product, thus only the excess water is involved in the downward flow. The dilute underwash zone leads not only to clean froth, but also maintains stable operation even when high fines oil sands are being processed.

Primary Froth

Rising to the surface, aerated oil globules, form a froth (13), on average containing 60–70% oil, 6–10% solids and 20–30% water, which overflow launders and is pumped to froth treatment facilities. An Undulating Conduit Hydro-Dynamic Mixer may be a suitable apparatus for washing the froth.

Middling Recycle

The middlings for recycle to the contactor (11), are taken from the froth separator via a collector pipe. By this means a certain percentage of solids, in particular fines, are being removed from the center of the froth separator ("F"). This removal (stream 11) creates some turbulence within the center zone of the froth separator which helps prevent the remaining fines from coalescing.

This stream should be transferred by Undulating Conduit Hydro-Dynamic Mixer, to prevent remaining oil and fines conglomeration.

Secondary Oil Recovery

Froth separator tailings (12) are withdrawn and introduced into the secondary oil recovery system ("G").

Secondary Recovery Froth

The product of secondary oil recovery system (14), usually a froth, high in solids, is introduced into middling recycle stream (9) and forwarded to the cyclo-distributor.

Secondary Oil Recovery Tailings

A low oil content discharge stream (15) from the secondary oil recovery circuit enters the sand settle ("D") as a sand tailings (16) dilution and flushing stream (80).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention comprises all the embodiments, modifications and variations coming within the scope and spirit of the claims herein.

What is claimed is:

1. A hydro-dynamic static mixing apparatus for flowing fluidized slurries comprising, in combination, a preselected and predetermined configuration and length of undulating tubular conduit for mixing and/or transporting various substances including highly abrasive solids contained in slurries, said conduit being interconnected into a transportation and processing separation system for such slurries, said conduit having an internal radius $r_1$ and the undulations are formed by a coil having a second radius $r_2$ such that the diameter of the conduit is greater than the coil diameter, means for pumping said fluidized slurry through the undulating interior conduit portion at some stage of transportation through the separation system, and said undulating tubular conduit interior configuration causing dynamic mixing of flowing slurries as said slurries are pumped through the conduit.

2. A hydro-dynamic static mixing apparatus as claimed in claim 1 wherein said conduit is interconnected where said stage is an initial mixing stage for conditioning the slurry.

3. A hydro-dynamic static mixing apparatus as claimed in claim 1 wherein said conduit is interconnected where said stage is in transportation of the slurry to keep the contents in suspension.

4. A hydro-dynamic static mixing apparatus as claimed in claim 1 wherein said conduit is interconnected where said stage is in a transportation pipe line system to revitalize the contents between processing steps.

5. A hydro-dynamic static mixing apparatus as claimed in claim 1 wherein said undulating interior elongated tubular conduit is interposed at various stages of processing and transportation of oil-laden middlings in an oil sands separation system.

* * * * *